United States Patent [19]

Kanno

[11] Patent Number: 4,942,479
[45] Date of Patent: Jul. 17, 1990

[54] IMAGE INFORMATION PROCESSING APPARATUS

[75] Inventor: Masayuki Kanno, Fujisawa, Japan

[73] Assignee: Kabushiki Kaisha Toshiba, Kawasaki, Japan

[21] Appl. No.: 338,340

[22] Filed: Apr. 13, 1989

Related U.S. Application Data

[63] Continuation of Ser. No. 62,495, Jun. 15, 1987, abandoned.

[30] Foreign Application Priority Data

Jun. 17, 1986 [JP] Japan .................................. 61-140915

[51] Int. Cl.$^5$ .............................................. H04N 1/40
[52] U.S. Cl. ..................................... 358/448; 353/444; 353/451; 353/453; 353/445
[58] Field of Search ............... 358/287, 257, 282, 256, 358/444, 445, 448, 451; 359/256, 453

[56] References Cited

U.S. PATENT DOCUMENTS

| | | | |
|---|---|---|---|
| 4,280,143 | 7/1981 | Judd | 358/433 |
| 4,595,956 | 6/1986 | Kawamura et al. | 358/459 |
| 4,679,096 | 7/1987 | Nagashima | 358/287 |
| 4,698,688 | 10/1987 | Ochi et al. | 358/257 |
| 4,814,890 | 3/1989 | Kato | 358/257 |
| 4,827,349 | 5/1989 | Ogata et al. | 358/257 |

FOREIGN PATENT DOCUMENTS 0212131 4/1987 European Pat. Off. .
2158672 11/1985 United Kingdom .

*Primary Examiner*—Edward L. Coles, Sr.
*Attorney, Agent, or Firm*—Finnegan, Henderson, Farabow, Garrett, and Dunner

[57] ABSTRACT

Plural items of image information having different pixel densities are stored on an optical disk. The pixel densities for the image information are stored in an image information memory address storage area of a magnetic disk, and conversion factors for converting the different pixel densities into a predetermined pixel density for an output device are stored in a pixel density conversion table storage area of the magnetic disk. When image information read out from the optical disk has a pixel density different from the predetermined pixel density, the pixel density associated with the read-out image information is read out from the image information memory address storage area. Then, the conversion factor associated with the read-out pixel density and the predetermined pixel density is read out from the pixel density conversion table storage area. The pixel density of the read-out image information is converted, according to the read-out conversion factor, by a magnification/reduction/rotation circuit, and then output from the output device.

22 Claims, 4 Drawing Sheets

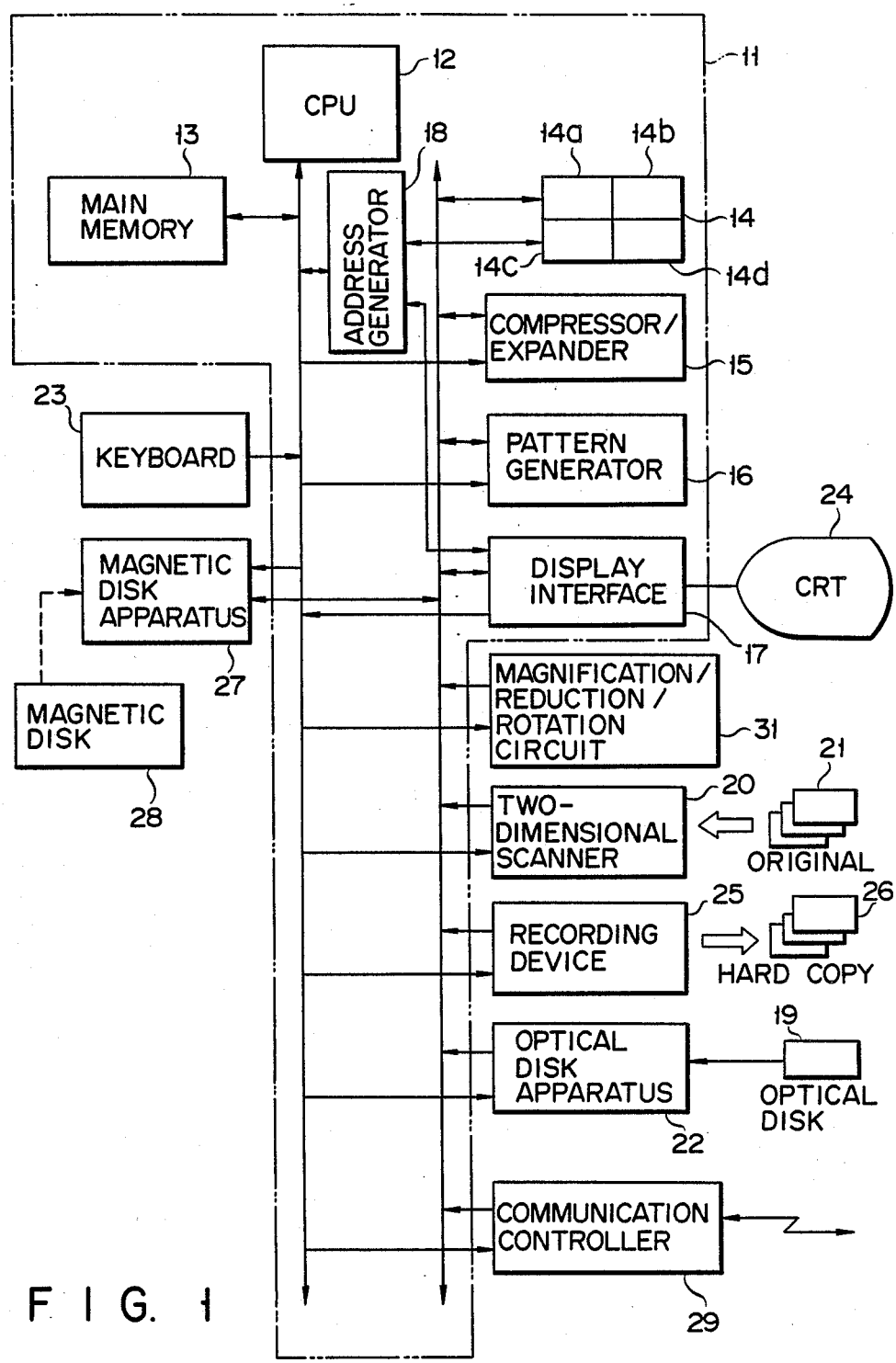
F I G. 1

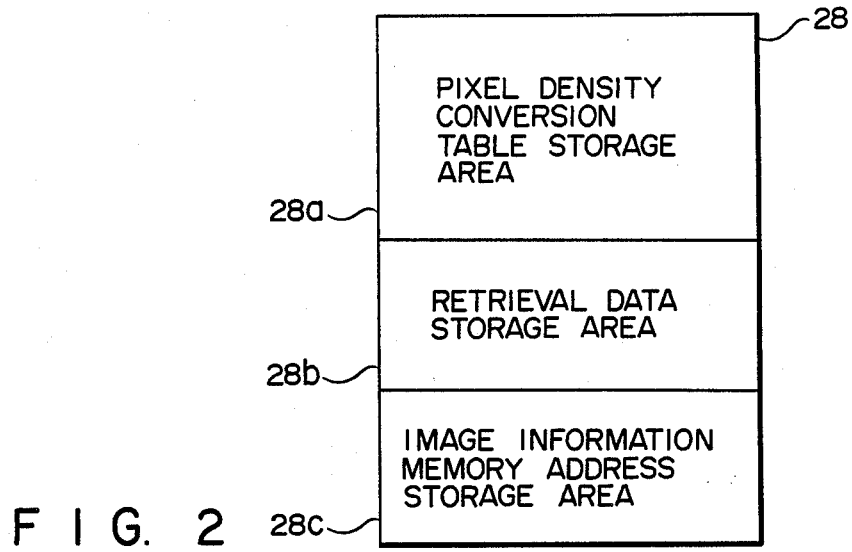
F I G. 2
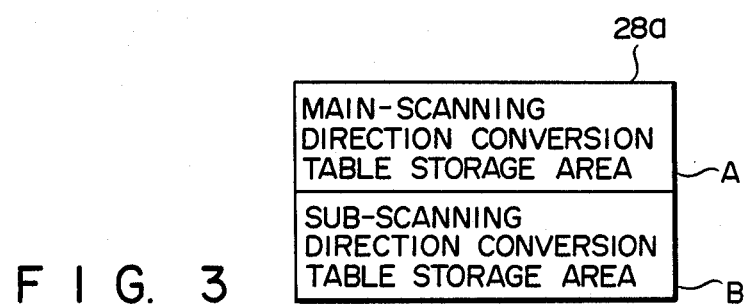
F I G. 3
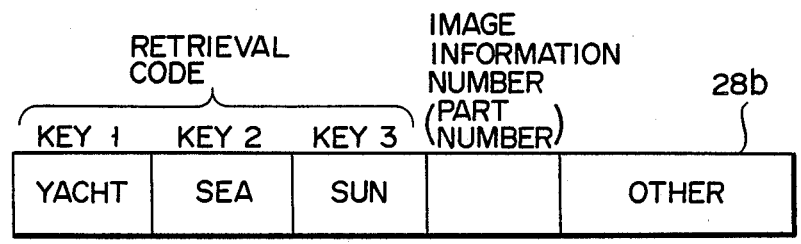
F I G. 4

| IMAGE INFORMATION NUMBER (PART NUMBER) | MEMORY ADDRESS | | | | | | |
|---|---|---|---|---|---|---|---|
| | S | P | $D_1$ | $D_2$ | ADR | MR/MH | V |
| 000001 | A4 | V | 8 | 7.7 | 000100 | MR | 10 |
| 000002 | A4 | V | 16 | 15.4 | 000200 | MR | 50 |
| 000003 | A4 | V | 8 | 7.7 | 000300 | MR | 15 |
| 000004 | A4 | V | 8 | 8 | 000400 | MR | 20 |
| 000005 | A4 | V | 400 | 400 | 000500 | MR | 60 |
| 000006 | A3 | V | 16 | 15.4 | 000600 | MR | 40 |
| 000007 | A4 | H | 200 | 200 | 000750 | MR | 35 |
| 000008 | A4 | V | 8 | 7.7 | 000850 | MR | 10 |
| 000009 | B4 | H | 16 | 15.4 | 000950 | MH | 50 |
| ----- | ----- | ----- | ----- | ----- | ----- | ----- | ----- |
| 100001 | 150 X 180 | V | 8 | 8 | 010000 | MR | 5 |
| 100002 | 60 X 30 | V | 16 | 16 | 010030 | MR | 3 |
| 100003 | 100X200 | V | 200 | 200 | 010050 | MR | 10 |
| 100004 | 135 X 70 | V | 400 | 400 | 010070 | MR | 13 |
| ----- | ----- | ----- | ----- | ----- | ----- | ----- | ----- |

28c

F I G. 5

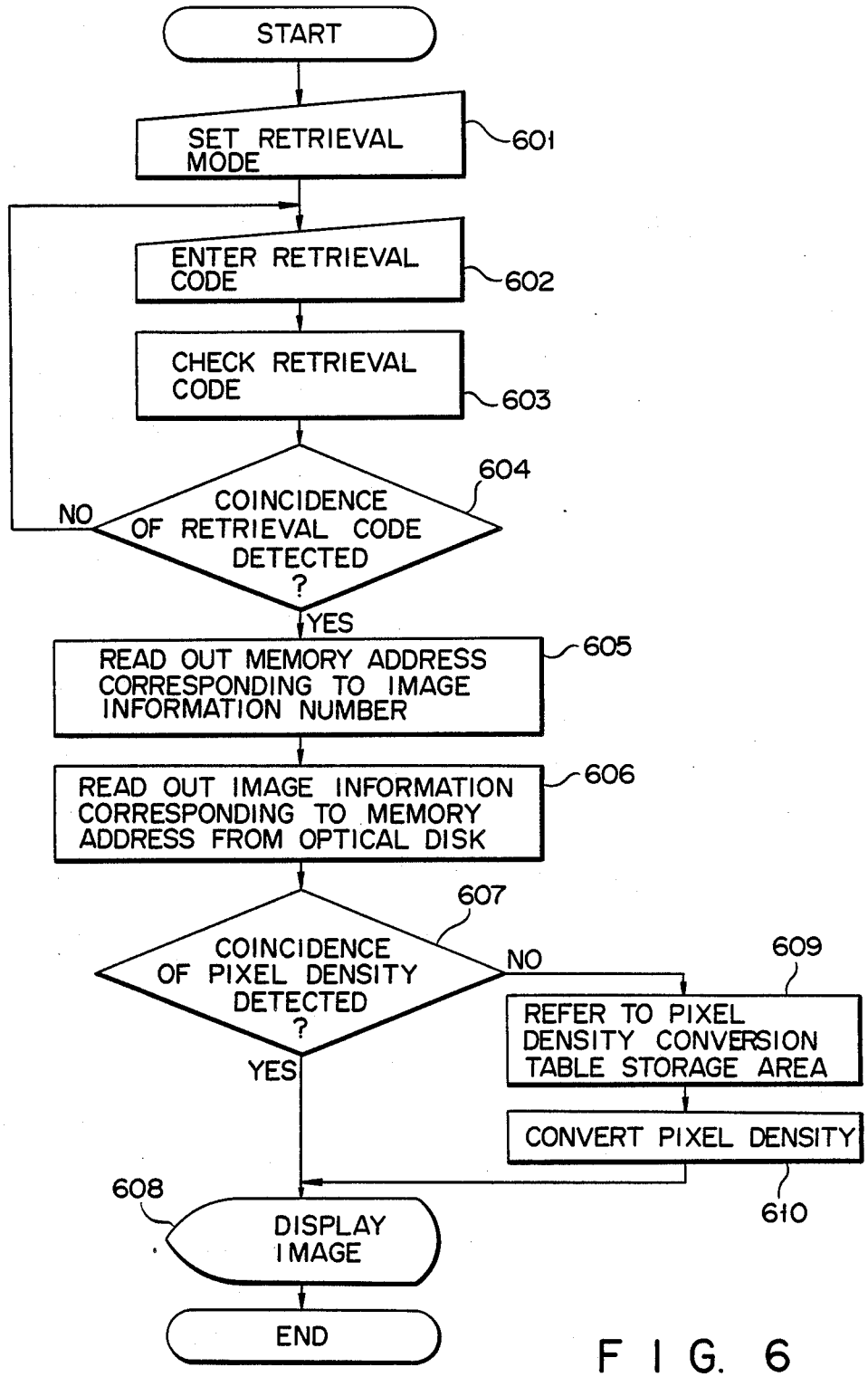
F I G. 6

IMAGE INFORMATION PROCESSING APPARATUS

This application is a continuation of application Ser. No. 062,495, filed June 15, 1987, now abandoned.

BACKGROUND OF THE INVENTION

The present invention relates to an image information processinq apparatus, such as an electronic filing apparatus which stores a vast amount of image information and performs retrieval or edition of the stored image information.

Recently, an electronic filing apparatus has been developed for use as an image information processing apparatus to process a vast amount of image information such as documents. This electronic filing apparatus reads a vast amount of such image information by means of optical, two-dimensional scanning, sequentially stores the image information on, for example, an optical disk, and stores retrieval data for each item of the image information on, for example, a magnetic disk. When the retrieval data is entered, the electronic filing apparatus retrieves the image information stored in the optical disk and provides a visual output of the information, by means of an output device such as a cathode ray tube display device (hereinafter referred to as CRT display device) or a recording device. Furthermore, this type of filing apparatus can be applied to a system that comprises a plurality of terminals for inputting, retrieving, and editing image information, all of which are coupled on-line to an electronic filing apparatus (host machine), which stores all the image information processed by the terminals, or to a system in which host machines located in separate departments are coupled on-line to one another, so that one host machine can retrieve image information stored in another machine when needed.

However, the pixel density of image information processed by such host machines is limited. Conventional terminals and electronic filing apparatuses are coupled to input/output devices for image information, such as a scanner, a facsimile machine, and a printer, which have a pixel density (or resolution) of 8 pixels/mm×7.7 pixels/mm (main-scanning direction×sub-scanning direction) or 18 pixels/mm×15.4 pixels/mm (mainscanning direction×sub-scanning direction). Therefore, the electronic filing apparatus is designed to process only image information with 8 pixels/mm×7.7 pixels/mm or 16 pixels/mm×15.4 pixels/mm, which matches the pixel density of the input/output devices.

Some recent electronic filing apparatus, however, are designed to be coupled to input/output devices having a pixel density different from that of conventional devices, in order to process image information with new pixel densities. Accordingly, image information may have various types of pixel densities: they may be reproduced in the form of pixels/mm or pixels/inch, or may differ in the number of pixels per mm or inch, for example, 8 pixels/mm, 16 pixels/mm, 200 pixels/inch, or 400 pixels/inch. Therefore, it is likely that image information with different pixel densities are transferred between input/output devices with different pixel densities. This may happen when electronic filing apparatuses storing image information with a conventional pixel density are coupled on-line to those storing image information with a new pixel density via a LAN (local area network) to provide information retrieval between these apparatuses, or when image information stored in an optical disk with one pixel density is retrieved by another apparatus with a different pixel density.

Suppose that a apparatus which stores image information with a pixel density of 8 pixels/mm×7.7 pixels/mm is coupled on-line to another apparatus which stores image information with a pixel density of 200 pixels/inch×200 pixels/inch. When the image information stored in the former apparatus is retrieved by the latter apparatus, the output image information differs from the original (proper) image information, and is deformed such that the output image information has a reduced size for the main-scanning direction and a increased size for the sub-scanning direction in comparison to the original.

When image information stored in an optical disk with a pixel density of 200 pixels/inch×200 pixels/inch is retrieved by an apparatus that stores image information with a pixel density of 8 pixels/mm×7.7 pixels/mm, the output image information differs from the original (proper) image information and is distorted such that the output image information has an increased size, with respect to the main-scanning direction, and a reduced size, with respect to the sub-scanning direction, in comparison to the original. Further, when an apparatus that is correctly displaying image information (destination pasting image) with a pixel density of, for example, 400 pixels/inch×400 pixels/inch retrieves image information (source image) with a pixel density of 16 pixels/mm×15.4 pixels/mm and when the source information is pasted on the destination pasting image, the image information to be pasted (the source image) would be distorted on the destination pasting image.

Obviously therefore, when retrieval of image information with different pixel densities is executed by means of the prior art, the original or source image information cannot be accurately reproduced.

SUMMARY OF THE INVENTION

With the above situation in mind, it is an object of this invention to provide an image information processing apparatus that overcomes the conventional problem of inaccurate reproduction of the original image information when image information with different pixel densities is processed simultaneously, and that can accurately reproduce the original image information without distortion, even when image information with different pixel densities is involved.

To achieve this object, the image information processing apparatus of this invention comprises means for supplying image information of various pixel densities, means for outputting the image information supplied from said supplying means, said outputting means having a predetermined pixel density, means for storing pixel density conversion factors, and means for reading the pixel density conversion factor corresponding to pixel density of image information supplied from said supplying means from said storage means, and for converting pixel density of image information supplied from said supplying means into the pixel density of said outputting means according to said read pixel density conversion factor.

Alternatively, the image information processing apparatus of this invention comprises means for storing image information having different pixel densities, means for reading desired image information from said storage means, means for outputting the image information supplied from said image information reading means, said outputting means having a predetermined pixel density, first memory means, for storing a pixel density of each image information stored in said storage means, in association with said each image information, second memory means, for storing pixel density conversion factors corresponding to said different pixel densities, and means for reading the pixel density corresponding to image information read by said image information reading means from said first memory means, for reading that pixel density conversion factor corresponding to said pixel density and the pixel density of said outputting means from said second memory means, and for converting the pixel density of image information read by said image information reading means into the pixel density of said output means according to said read pixel density conversion factor.

Alternatively, the image information processing apparatus of this invention comprises means for selectively supplying image information of various pixel densities, means for storing pixel density conversion factors, means for reading the pixel density conversion factors corresponding to the pixel density of image information supplied from said supplying means from said storing means, means for converting into the pixel density of image information supplied from said supplying means according to the pixel density conversion factor read by said reading means, and means for outputting image information converted the pixel density by said converting means.

BRIEF DESCRIPTION OF THE DRAWINGS

FIG. 1 is a schematic block diagram of an electronic filing apparatus as an example of an image information processing apparatus embodying this invention;

FIG. 2 is a diagram showing the storage structure of a magnetic disk shown in FIG. 1;

FIG. 3 is a diagram showing an example of the contents of a pixel density conversion table storage area shown in FIG. 2;

FIG. 4 is a diagram showing an example of the contents of a retrieval data storage area shown in FIG. 2;

FIG. 5 is a diagram showing an example of an image information memory address storage area shown in FIG. 2; and FIG. 6 is a flowchart explaining a retrieval operation.

DETAILED DESCRIPTION OF THE PREFERRED EMBODIMENT

An embodiment of the present invention will now be explained, in conjunction with the accompanying drawings.

FIG. 1 shows the arrangement of an electronic filing apparatus as an example of an image information processing apparatus embodying this invention. A main controller 11 comprises a CPU (central processing unit) 12, a main memory 13, a buffer memory 14, a compressor/expander 15, a pattern generator 16, a display interface 17, and an address generator 18. CPU 12 controls the overall apparatus. Main memory 13 stores input retrieval codes, etc. Buffer memory 14 has a memory capacity corresponding to image information for several A4-size pages, and has memory areas 14a, 14b, 114c, and 14d provided for a maximum of four windows which may be opened on a CRT display device 24, respectively.

Compressor/expander 15 compresses image information (or decreases its redundancy) and expands it (or restores the decreased redundancy of the original). Pattern generator 16 stores pattern data such as characters and symbols. Display interface 17 executes display control of CRT display device 24. Address generator 18 controls access to display memories (not shown) provided in buffer memory 14 and display interface 17.

Main controller 11 is coupled to a scanner 20, an optical disk apparatus 22, a keyboard 23, CRT display device 24, which is used as an output device, a recording device 25, which is also used as an output device, a magnetic disk apparatus 27, a communication controller 29, and a magnification/ reduction/rotation circuit 31, which is used as a conversion unit. Scanner 20 may be a two-dimensional scanner, which two-dimensionally scans an original document 21 by means of a laser beam, to provide an electric signal corresponding to the image information on the original. Optical disk apparatus 22 sequentially stores or writes, onto an optical disk 19, image information which is scanned by two-dimensional scanner 20 and supplied via main controller 11, or reads out image information from optical disk 19. Keyboard 23 is for entering a specific retrieval code for each image information and various operation commands.

CRT display device 24 displays image information that has been scanned by two-dimensional scanner 20 and supplied via main controller 11, or image information that has been read out from optical disk apparatus 22 and then supplied via main controller 11. In a broader sense, CRT display device 24 and display interface 17 of main controller 11 constitute an image information display apparatus. CRT display device 24 is capable of simultaneously displaying four documents (image information) within a maximum of four windows, so that magnification, reduction, rotation, and scrolling of image information can be carried out for each window. Recording device 25 provides a hard copy 26 of image information that is supplied via controller 11, for example, after the image information is scanned by two-dimensional scanner 20 or after the image information is read out from optical disk apparatus 22.

Magnetic disk apparatus 27 stores a retrieval code and retrieval data, entered via keyboard 23, on a magnetic disk 28 for each item of image information. The retrieval data includes an image information number or a part number ("part" means a partial image, i.e., part of a document as a mass of image) for each item of image information associated with the retrieval code, the size, direction, pixel density, and compressing mode of the image information associated with the image information number or part number, and a memory address on optical disk 19 where this image information is stored.

Communication controller 29 is coupled via a communication line to the communication controller of each terminal (not shown) or to another electronic filing apparatus, and transmits image information requested for retrieval or edition to the requesting terminal or electronic filing apparatus. Communication controller 29 also receives a process request and transfers stored image information and its retrieval code or the retrieval code for retrieving image information to be edited, to main controller 11.

Magnification/reduction/rotation circuit 31 executes magnification, reduction, and rotation of image information and, when the output of image information is provided by CRT display device 24 or recording device 25 (both serving as an output device), this circuit also converts the pixel density of the image information according to the conversion factor that is associated with the pixel density of the image information, and the pixel density of the selected output device or the pixel density of the destination image subjected to an image editing process.

CPU 12 performs on-line image information retrieval using the data (retrieval code) that corresponds to a requested retrieval or edition and that is supplied from communication controller 29. When CPU 12 finds the desired image information, it transmits an "image-found signal" and the image information to the requesting terminal or electronic filing apparatus via communication controller 29. When the desired image information is not found, CPU 12 transmits an "image-not-found signal" to the requesting unit.

In accordance with the image information and retrieval code from communication controller 29, CPU 12 causes optical disk apparatus 22 to store the image information onto optical disk 19. CPU 12 also executes an operation according to a process request entered via keyboard 23 by an operator.

As is shown in FIG. 2, magnetic disk 28 includes a pixel density conversion table storage area 28a, a retrieval data storage area 28b, and an image information memory address storage area 28c. Pixel density conversion table storage area 28a contains conversion factors, which are associated with the pixel density of image information and the pixel densities of output devices such as CRT display device 24 and recording device 25 or the pixel density of a destination image in an image editing operation. Retrieval data storage area 28b contains a retrieval code and the image information number of the image information associated with this code, or the part number of partial image information (i.e., part image information) associated with the code for each optical disk. Image information memory address storage area 28c stores a memory address of each item of image information for every image information number or part number.

As is shown in FIG. 3, pixel density conversion table storage area 28a includes a main-scanning directable conversion table storage area A and a sub-scanning direction conversion table storage area B. Main-scanning direction conversion table storage area A stores conversion factors for converting a pixel density with respect to the main-scanning (vertical) direction, while sub-scanning direction conversion table storage area B stores conversion factors with respect to the sub-scanning (horizontal) direction. More specifically, main-scanning direction conversion table storage area A stores conversion factors, which are associated with the pixel density of image information (conversion source or transfer source) in the main-scanning direction and the pixel densities of output devices such as CRT display device 24 and recording device 25 (conversion destination) or the pixel density of a destination image for an image editing operation (see Table 1 below). For example, to express image information with a pixel density of 8 pixels/mm (conversion source or transfer source) as image information with a pixel density of 16 pixels/mm, 200 pixels/inch, or 400 pixels/inch (conversion destination or transfer destination), the source image information is converted using a conversion factor of 2.00, 0.98, or 1.97, respectively. To express image information with a pixel density of 16 pixels/mm as destination image information with a pixel density of 8 pixels/mm, 200 pixels/inch, or 400 pixels/inch, the source image information is converted using a conversion factor of 0.50, 0.49, or 0.98, respectively. Similarly, image information with a pixel density of 200 pixels/inch or 400 pixels/inch is converted so as to have an appropriate pixel density, by use of Table 1.

TABLE 1

Pixel Density Conversion Factors For Main-Scanning Direction

| Source | Destination | | | |
|---|---|---|---|---|
| | 8 pixels/mm | 16 pixels/mm | 200 pixels/inch | 400 pixels/inch |
| 8 pixels/mm | 1.00 | 2.00 | 0.98 | 1.97 |
| 16 pixels/mm | 0.50 | 1.00 | 0.49 | 0.98 |
| 200 pixels/inch | 1.02 | 2.03 | 1.00 | 2.00 |
| 400 pixels/inch | 0.51 | 1.02 | 0.50 | 1.00 |
| . | . | . | . | . |
| . | . | . | . | . |
| . | . | . | . | . |

Sub-scanning direction conversion table storage area B stores conversion factors which are associated with the pixel density of image information (conversion source or transfer source) in the sub-scanning direction and the pixel densities of output devices, such as CRT display device 24 and recording device 25 (conversion destination) or the pixel density of a destination image for an image editing operation (see Table 2 below). For example, to express image information with a pixel density of 200 pixels/inch as image information with a pixel density of 7.7 pixels/mm, 8 pixels/mm, 15.4 pixels/mm, 16 pixels/mm, or 400 pixels/inch, the source image information is converted using a conversion factor of 0.98, 1.02, 1.96, 2.03, or 2.00, respectively. To express image information with a pixel density of 400 pixels/inch as destination image information with a pixel density of 7.7 pixels/mm, 8 pixels/mm, 15.4 pixels/mm, 16 pixels/mm, or 200 pixels/inch, the source image information is converted using a conversion factor of 0.49, 0.51, 0.98, 1.02, or 0.50, respectively. Similarly, image information with a pixel density of 7.7 pixels/mm, 8 pixels/mm, 15.4 pixels/mm, or 16 pixels/mm is converted so as to have an appropriate pixel density, by use of Table 2.

TABLE 2

Pixel Density Conversion Factors For Sub-Scanning Direction

| Source | Destination | | | | | |
|---|---|---|---|---|---|---|
| | 7.7 pixels/mm | 8 pixels/mm | 15.4 pixels/mm | 16 pixels/mm | 200 pixels/inch | 400 pixels/inch |
| 7 pixels/mm | 1.00 | 1.04 | 2.00 | 2.08 | 1.02 | 2.05 |
| 8 pixels/mm | 0.96 | 1.00 | 1.93 | 2.00 | 0.98 | 1.97 |
| 15.4 pixels/mm | 0.50 | 0.52 | 1.00 | 1.04 | 0.51 | 1.02 |
| 16 pixels/mm | 0.48 | 0.50 | 0.96 | 1.00 | 0.49 | 0.98 |
| 200 pixels/inch | 0.98 | 1.02 | 1.96 | 2.03 | 1.00 | 2.00 |
| 400 pixels/inch | 0.49 | 0.51 | 0.98 | 1.02 | 0.50 | 1.00 |
| . | . | . | . | . | . | . |
| . | . | . | . | . | . | . |

As is shown in FIG. 4, retrieval data storage area 28b stores a retrieval code including a plurality of retrieval keys, and an image information number (direct number), which is a specific number for each item of image information, or a part number (direct number), which is a specific number for each part image information.

As is shown in FIG. 5, image information memory address storage area 28c stores a memory address for each item of image information which includes a size S of the image information associated with the image information number (or part number), a direction P which indicates whether the image information is written vertically (V) or horizontally (H), a pixel density $D_1$ of the image information, with respect to the main-scanning direction, a pixel density $D_2$ of the image information, with respect to the sub-scanning direction, an image information leading address ADR from which the image information is stored, a compressing mode MR/MH that indicates whether the image information is compressed in the MR (Modified Read Coding) mode or the MH (Modified Hoffman Coding) mode, and a block number V indicating the amount (block size) of the stored image information.

The operation of the electronic filing apparatus with the aforementioned arrangement will now be explained, with reference to the flowchart of FIG. 6.

First, a case is explained in which the electronic filing apparatus having output devices such as CRT display device 24 and recording device 25, which have a pixel density of 200 pixels/inch×200 pixels/inch, retrieves image information from optical disk 19, which stores image information with various pixel densities. A retrieval mode is set via keyboard 23 (step 601) and a retrieval code is entered thereby (step 602). Then, CPU 12 compares the retrieval code with retrieval codes stored in magnetic disk 28, to detect whether or not the entered code coincides with a stored code (steps 603 and 604). When a coincidence between codes is detected, the image information number (part number) associated with that code is read out from retrieval data storage area 28b, and the memory address associated with the image information number (part number) is read out from image information memory address storage area 28c (step 605). As a result, CPU 12 causes optical disk apparatus 22 to reproduce the image information on optical disk 19, from the address corresponding to the image information reading address ADR of the read-out memory address (step 606). CPU 12 also supplies image information (compressed information) for each scanning line, from optical disk apparatus 22 to compressor/expander 15, where the compressed information is restored to its original form, using MR or MH inverse conversion, and then supplies the original image information to page buffer 14. Then, CPU 12 reads out the pixel densities $D_1$ and $D_2$ of the read-out image information from image information memory address storage area 28c and determines whether or not the read-out pixel densities coincide with those of CRT display device 24 and recording device 25 (step 607).

When the determination is affirmative, i.e., when the pixel density of the obtained image information is 200 pixels/inch×200 pixels/inch, no pixel-density conversion is performed, and all of the reproduced image information for one page is stored in page buffer 14. When the image information for one page is stored in buffer memory 14, CPU 12 causes display interface 17 to display the image information on CRT display device 24, or causes recording device 25 to provide a hard copy 26 of the image information (step 608).

When the pixel density of the attained image information does not coincide with those of CRT display device 24 and recording device 25 (step 607), CPU 12 refers to pixel density conversion table storage area 28a and reads out the appropriate conversion factors with respect to the main-scanning and sub-scanning directions (step 609). That is, the conversion factor for the pixel density with respect to the main-scanning direction of the output devices, such as recording device 25 (conversion destination), is read out from main-scanning direction conversion table storage area A, while the conversion factor for the pixel density with respect to the sub-scanning direction is read out from sub-scanning direction conversion table storage area B.

For example, when the obtained image information (conversion source) has a pixel density of 8 pixels/mm×7.7 pixels/mm, CPU 12 refers to pixel density conversion table storage area 28a, and reads out therefrom the conversion factors of 0.98, with respect to the main-scanning direction, and 1.02, with respect to the subscanning direction, which are associated with the pixel density (conversion destination) of 200 pixels/inch×200 pixels/inch. Then, the pixel densities with respect to the main-scanning and sub-scanning directions of the image information (conversion source) which has been stored in page buffer 14, after the MR reverse conversion by compressor/expander 15, are converted by magnification/reduction/rotation circuit 31, on the basis of the read-out conversion factors (step 610). In other words, the pixel density for the main-scanning direction is converted from 8 pixels/mm to 200 pixels/inch, while the pixel density with respect to the sub-scanning direction is converted from 7.7 pixels/mm to 200 pixels/inch.

As another example, when the pixel density of the obtained image information (conversion source) is 400 pixels/inch×400 pixels/inch, CPU 12 refers to pixel density conversion table storage area 28a, and reads out therefrom the conversion factors of 0.50 with respect to the main-scanning direction, and 0.50, with respect to the sub-scanning direction, which are associated with the pixel density (conversion destination) of 200 pixels/inch×200 pixels/inch (step 609). Then, the pixel densities of 400 pixels/inch, with respect to the main-scanning and sub-scanning directions of the image information (conversion source) which has been stored in page buffer 14, after the MR reverse conversion by compressor/expander 15, are converted to pixel densities of 200 pixels/inch by magnification/ reduction/rotation circuit 31, on the basis of the read-out conversion factors (step 610).

The image information having the thus-converted pixel density is sequentially supplied to page buffer 14. When all of the image information for one page, and having the converted pixel density, is stored in page buffer 14, CPU 12 causes display interface 17 to display the image information on CRT display device 24, or causes recording device 25 to provide a hard copy 26 of the image information (step 608).

Another case is explained in which the electronic filing apparatus having output devices such as CRT display device 24 and recording device 25, which have a pixel density of 16 pixels/mm×15.4 pixels/mm, retrieves image information from optical disk 19, which stores image information having various pixel densities. Suppose now that a retrieval mode is set via keyboard 23 and a retrieval code is entered thereby. Then, CPU 12 compares the retrieval code with retrieval codes stored in magnetic disk 28, to detect whether or not the entered code coincides with a stored code. When a coincidence between codes is detected, the image information number (part number) associated with that code is read out from retrieval data storage area 28b, and the memory address associated with the image information number (part number) is read out from image information memory address storage area 28c. As a result, CPU 12 causes optical disk apparatus 22 to reproduce the image information on optical disk 19, from the address corresponding to the image information reading address ADR of the read-out memory address. CPU 12 also supplies image information (compressed information for each scanning line from optical disk apparatus 22 to compressor/ expander 15, where the compressed information is restored to its original form, using MR or MH inverse conversion, and then supplies the original image information to page buffer 14. Then, CPU 12 reads out the pixel densities $D_1$ and $D_2$ of the read-out image information from image information memory address storage area 28c, and determines whether or not the read-out pixel densities coincide with those of CRT display device 24 and recording device 25.

When the determination is affirmative, i.e., when the pixel density of the obtained image information is 16 pixels/mm×15.4 pixels/mm, no pixel-density conversion is performed, and all of the reproduced image information for one page is stored in page buffer 14. When the image information for one page is stored in buffer memory 14, CPU 12 causes display interface 17 to display the image information on CRT display device 24, or causes recording device 25 to provide a hard copy 26 of the image information.

When the pixel density of the attained image information does not coincide with those of CRT display device 24 and recording device 25, CPU 12 refers to pixel density conversion table storage area 28a, and reads out the appropriate conversion factor for the pixel density (conversion destination), with respect to the main-scanning direction, from main-scanning direction conversion table storage area A, and reads out the appropriate conversion factor for the pixel density (conversion destination), with respect to the sub-scanning direction, from sub-scanning direction conversion table storage area B.

For example, when the obtained image information (conversion source) has a pixel density of 200 pixels/inch×200 pixels/inch, CPU 12 refers to pixel density conversion table storage area 28a, and reads out therefrom the conversion factors of 2.03, with respect to the main-scanning direction, and 1.96, with respect to the sub-scanning direction, which are associated with the pixel density (conversion destination) of 16 pixels/mm×15.4 pixels/mm. Then, the pixel densities with respect to the main-scanning and sub-scanning directions of the image information (conversion source) that which has been stored in page buffer 14, after the MR reverse conversion by compressor/expander 15, are converted from 200 pixels/inch to 16 pixels/mm and from 200 pixels/inch to 15.4 pixels/mm, respectively, by magnification/reduction/rotation circuit 31, on the basis of the read-out conversion factors.

As another example, when the pixel density of the obtained image information (conversion source) is 8 pixels/mm×7.7 pixels/mm, CPU 12 refers to pixel density conversion table storage area 28a, and reads out therefrom the conversion factors of 2.00, with respect to the main-scanning direction, and 2.00, with respect to the sub-scanning direction, which are associated with the pixel density (conversion destination) of 16 pixels/mm×15.4 pixels/mm. Then, the pixel densities of 8 pixels/mm, with respect to the main-scanning direction, and 7.7 pixels/mm, with respect to the sub-scanning direction of the image information (conversion source) which has been stored in page buffer 14, after the MR reverse conversion by compressor/expander 15, are converted into pixel densities of 16 pixels/mm and 15.4 pixels/mm, respectively, by magnification/reduction/rotation circuit 31, on the basis of the read-out conversion factors.

The image information having the thus-converted pixel density is sequentially supplied to page buffer 14. When all of the image information for one page, and having the converted pixel density, is stored in page buffer 14, CPU 12 causes display interface 17 to display the image information on CRT display device 24, or causes recording device 25 to provide a hard copy 26 of the image information.

As has been explained above, when the pixel density of the output device for providing the output of image information differs from that of attained image information, the pixel density of the attained image information is converted so as to coincide with that of the output device. This ensures the proper transferring of image information and thus provides accurate reproduction of the original image information, even when the pixel density of the original image information differs from that of the output device.

In the aforementioned embodiment, image information is retrieved from optical disk apparatus 19. However, this invention can apply to a system in which electronic filing apparatuses storing image information having different pixel densities are coupled to one another via a LAN, and the image information of one apparatus is retrieved on-line by another apparatus. In this case, the pixel density of the image information obtained via communication controller 29 has to be converted according to the pixel density of the retrieving apparatus. Suppose an electronic filing apparatus in which image information having a pixel density of 8 pixels/mm×7.7 pixels/mm is coupled via a LAN to another electronic filing apparatus which contains image information having a pixel density of 200 pixels/inch×200 pixels/inch. When image information whose pixel density is 8 pixels/mm×7.7 pixels/mm is retrieved online, the conversion factors of 0.98 and 1.02, associated with the the pixel density of the conversion destination, are read out from pixel density conversion table storage area 28a, in advance. The pixel density with respect to the main-scanning direction of the image information transmitted via communication controller 29 is converted from 8 pixels/mm to 200 pixels/inch, using the former conversion factor of 0.98, and the pixel density with respect to the sub-scanning direction is converted from 7.7 pixels/mm to 200 pixels/inch, using the latter conversion factor of 1.02. Accordingly, it is possible to treat image information having a pixel density of 8 pixels/mm×7.7 pixels/mm as image information having a pixel density of 200 pixels/inch 200 pixels/inch. Therefore, even when the retrieved image information is output from the output device such as recording device 25 whose pixel density differs from that of the retrieved image information, it is possible to reproduce the original image accurately, without increasing or decreasing its size.

The same procedure can apply to the case where part image information is retrieved for an image editing operation. Assume that image information having a 200 pixels/inch×200 pixels/inch pixel density is stored in an electronic filing apparatus and that part image information having this pixel density, as well as part image information having a pixel density of 8 pixels/mm×7.7 pixels/mm are retrieved to be edited. Then, pixel density conversion table storage area 28a is referred to, and the conversion factors of 0.98, with respect to the main-scanning direction, and 1.02, with respect to the sub-scanning direction, are read out therefrom so as to convert the image information with the 8 pixels/mm×7.7 pixels/mm pixel density into image information with the 200 pixels/inch×200 pixels/inch pixel density. Based on the conversion factors, the pixel density of 8 pixels/mm with respect to the main-scanning direction and the pixel density of 7.7 pixels/mm with respect to the sub-scanning direction are both converted to pixel density of 200 pixels/inch×200 pixels/inch. Then, the image information having the converted pixel density of 200 pixels/inch×200 pixels/inch and that originally having the 200 pixels/inch×200 pixels/inch are displayed on the same screen of CRT display device 24. As a result, when displaying part image information, the original image information can be accurately reproduced, without increasing or decreasing its size. Therefore, it is possible to edit different partial image information, such as one with a pixel density of 8 pixels/mm×7.7 pixels/mm and another with a pixel density of 200 pixels/inch×200 pixels/inch.

An image editing process for pasting part image information onto a pasting image can similarly be performed. Assume that part image information having a pixel density of 16 pixels/mm×15.4 pixels/mm is retrieved and pasted onto image information (pasting image) having a pixel density of 400 pixels/inch×400 pixels/inch. Then, pixel density conversion table storage area 28a is referred to, and the conversion factors of 0.98, with respect to the main-scanning direction, and 1.02, with respect to the sub-scanning direction are read out therefrom, so as to convert the image information with the 16 pixels/mm×15.4 pixels/mm pixel density to image information with the 400 pixels/inch×400 pixels/inch pixel density. That is, the conversion factors with respect to the pixel densities for the main-scanning and sub-scanning directions for the pasting image (destination) are attained. Based on the conversion factors, the pixel density of 16 lpixels/mm with respect to the main-scanning direction is converted into 400 pixels/inch, as is also the pixel density of 15.4 pixels/mm with respect to the sub-scanning direction. As a result, the image information originally having a pixel density of 16 pixels/mm×15.4 pixels/mm can be treated as the pasting image having the pixel density of 400 pixels/inch×400 pixels/inch. Therefore, it is possible to paste image information free of any expansion or reduction in size onto the pasting image.

In this manner, it is possible to process image information, irrespective of whether it is part image information or whole image information, in an editing operation involving whole image information and part image information having different pixel densities; or involving part image information having different pixel densities; or involving enlarged/reduced image information or part image information, or pasting, cut and pasting and synthesizing operations involving part image information having one pixel density and whole or part image information each having a different pixel density; or another editing operation involving a logical operation. Accordingly, it is not necessary to perform a separate process after the editing process, in order to provide an appropriate and consistent pixel density over the entire edited image information; thus, the image processing speed is increased. In this embodiment, part image information is what is indicated by the image information numbers (part numbers) following "100001," as is shown in FIG. 5.

Further, the above embodiment has been explained using the case where the pixel densities of the input/output devices or terminals coupled to main controller 11 are specifically given, i.e., the pixel densities of the conversion or transfer destinations are known in advance. However, this invention can also be applied in the case where various input/output devices or terminals with different pixel densities are coupled to main controller 11 and it is not known in advance which input/output device or terminal is to be used. In this case, a connected-device managing table, such as Table 3 given later, needs to be provided in another memory area of magnetic disk 28 and used to determined which input/output device or terminal is currently coupled to main controller 11, and conversion of pixel densities of image information needs to be performed based on the conversion factors associated with the pixel density of the detected device or terminal. More specifically, the connected-device managing table stored in magnetic disk 28 includes the name of each input/output device or terminal to be coupled to main controller 11, the sizes of paper, the direction of an image, the pixel density of each device or terminal and a flag indicating the connection status thereof, with these attributes being in association with the number of each device or terminal. The flag is referred to determine what pixel density the input/output device or terminal currently coupled has, and based on the determination, the pixel density of image information to be treated is converted to coincide with that of the currently-coupled device. In this manner, it is possible to treat different input/output devices, such as a scanner, a facsimile and a printer, without any problems, and prevent undesirable deformation of processed image information, thus ensuring the proper expression of the original image.

TABLE 3

| Connected-Device Managing Table | | | | | |
|---|---|---|---|---|---|
| Device Number | Device Name | Paper Size | Direction | Resolution (Main-Scan) | (Sub-Scan) | Connection Flag |
| 1 | Scanner A | A4 | Vertical | 8 16 | 7.7 15.4 | On |
| 2 | Printer A | A4 | Vertical | 16 | 15.4 | On |
| 3 | Scanner B | A3 | Vertical | 200 400 | 200 400 | Off |
| 4 | Terminal | — | — | 8 16 | 7.7 15.4 | On |
| 5 | Center | — | — | — | — | Off |
| 6 | Printer B | A3 | Vertical | 200 400 | 200 400 | Off |
| . | . | . | . | . | . | . |

Furthermore, when retrieved image information is output from output devices, such as CRT display device 24 and recording device 25 and the pixel density of the image information is not determined, i.e., when the pixel density of the image information is not stored in image information memory address storage area 28c, the retrieved image information is judged to have the conventional pixel density. For example, when the pixel densities corresponding to the retrieved image information stored at its memory address are only 8 pixels/mm × 8 pixels/mm and 16 pixels/mm × 15.4 pixels/mm, it would be determined that the pixel density of the retrieved image information is either 8 pixels/mm × 7.7 pixels/mm or 16 pixels/mm × 15.4 pixels/mm. Then, the conversion factor which is associated with this pixel density and the pixel density of an output device, such as CRT display device 24 or recording device 25, is read out from pixel density conversion table storage area 28a. Based on the conversion factors, the pixel density of the retrieved image information, either 8 pixels/mm × 7.7 pixels/mm or 16 pixels/mm × 15.4 pixels/mm is properly converted.

As explained above, according to this invention, the pixel density of image information can be converted into various values to provide a proper output of the image information, this invention provides a higher resolution and a higher flexibility to deal with image information with different pixel densities and use various input/output devices, such as a scanner, a facsimile, and a printer, which have different pixel densities. Therefore, even when an output of image information needs to be provided by an input/output device whose pixel density differs from that of the image information, the original image information would not be deformed when output.

In the aforementioned embodiment, a magnification/reduction/rotation circuit is used to convert the pixel density; however, such conversion may be performed using software instead. This eliminates the need for specific hardware and thus makes the involved apparatus more compact and reduces its manufacturing cost.

The pixel density conversion table, the connected-device managing table and the like are stored in a magnetic disk. However, they may be provided in main memory 13 of main controller 11 or another memory device.

Furthermore, in the embodiment, image information and retrieval data are stored in separate memory devices, such as optical disk 19 and magnetic disk 28, respectively. The data storage is not limited to this particular type; both the image information and retrieval data may be stored in the same optical disk. In this case, the optical disk may be separated into an internal section as a data storage area to store the retrieval data and an outer section as an image storage area to store the image information, or vice versa, as desired.

The aforementioned embodiment has been described to perform retrieval of image information; however, it may be modified such that image information scanned by a two-dimensional scanner (an input device) and image information scanned by another two-dimensional scanner can be processed to have the same pixel density and stored into a single optical disk.

As described above, this invention can provide an image information processing apparatus, which is capable of properly expressing the original image information without any deformation, even when image information with different pixel densities are processed together.

What is claimed is:

1. An image information processing apparatus, comprising:

means for obtaining information of a first pixel density by scanning an image;

image information storing means for storing the obtained image information together with pixel density data representing the first pixel density;

means for retrieving the stored image information together with the pixel density data;

means for outputting the retrieved image information, said outputting means having a second pixel density;

conversion factor storing means for storing pixel density conversion factors in both a horizontal and a vertical direction of a view image outputted from said outputting means;

means for reading pixel density conversion factors in both the horizontal and the vertical directions corresponding to the first pixel density of the image information of said image information storing means and the second pixel density of said outputting means from said conversion factor storing means; and means for converting the first pixel density of the image information in both the horizontal and the vertical directions to the second pixel density of said outputting means according to the pixel density conversion factors read out from said conversion factor storing means.

2. The apparatus according to claim 1, wherein said horizontal and vertical directions correspond to main-scanning and sub-scanning directions, respectively.

3. The apparatus according to claim 1, wherein said conversion factor storing means includes an optical memory.

4. The apparatus according to claim 1, further comprising:

communication control means for controlling data communication between said apparatus and another image information processing apparatus; and means for supplying data received from said another image information processing apparatus to said image information storing means.

5. The apparatus according to claim 1, wherein said information obtaining means includes an optical scanner.

6. The apparatus according to claim 1, wherein said outputting means includes a display device.

7. The apparatus according to claim 1, wherein said outputting means includes a printer.

8. The apparatus according to claim 1, wherein said retrieving means includes:

retrieving memory means for storing retrieval codes, each retrieval code corresponding to image information stored in said image information storing means;

means for inputting a desired retrieval code designating image information to be retrieved; and means for retrieving and outputting image information associated with said retrieval code input from said inputting means.

9. The apparatus according to claim 8, wherein said retrieving and outputting means includes means for comparing said desired retrieval code input by said inputting means with said retrieval codes stored in said retrieving memory means.

10. The apparatus according to claim 1, further comprising:

means for determining whether the first pixel density of image information read out by said reading means coincides with the second pixel density of said outputting means;

means for controlling a page buffer memory to store image information for one page when a coincidence is obtained in said determining means; and means for supplying the image information for one page to said outputting means to form a view of an image having a full size of said outputting means.

11. The apparatus according to claim 10, further comprising:

means, when no coincidence is obtained by said determining means, for controlling said reading means to output the pixel density conversion factors of the image information and the outputting means so as to convert the pixel density of the image information to the pixel density of said outputting means.

12. An image information processing apparatus, comprising:

means for obtaining a plurality of items of image information having a plurality of different pixel densities by scanning a plurality of images;

image information storing means for storing the obtained plurality of items of image information together with items of pixel density data representing the different pixel densities;

means for retrieving a desired item of stored image information together with corresponding pixel density data;

means for outputting the retrieved image information, said outputting means having a fixed pixel density;

first memory means for storing a pixel density of each image information stored in said image information storing means in association with each image information;

second memory means for storing pixel density conversion factors in both a horizontal and a vertical direction corresponding to said different pixel densities;

third memory means for storing pixel density conversion factors in both the horizontal and the vertical directions of a view image outputted from said outputting means;

means for reading pixel density conversion factors in both the horizontal and the vertical directions corresponding to a first pixel density of the desired item of stored image information from said image information storing means and a second pixel density of said outputting means from said conversion factor storing means; and means for converting the first pixel density of the image information in both the horizontal and the vertical directions to the second pixel density of said outputting means according to the pixel density conversion factors read out from said conversion factor storing means.

13. The apparatus according to claim 12, wherein said horizontal and vertical directions correspond to main-scanning and sub-scanning directions, respectively.

14. The apparatus according to claim 12, wherein said conversion factor storing means includes an optical memory.

15. The apparatus according to claim 12, further comprising:

communication control means for controlling data communication between said apparatus and another image information processing apparatus; and means for supplying data received from said another image information processing apparatus to said image information storing means.

16. The apparatus according to claim 12, wherein said image information obtaining means includes an optical scanner.

17. The apparatus according to claim 12, wherein said outputting means includes a display device.

18. The apparatus according to claim 12, wherein said outputting means includes a printer.

19. The apparatus according to claim 12, wherein said retrieving means includes:

retrieving memory means for storing retrieval codes, each code corresponding to image information stored in said image information storing means;

means for inputting a desired retrieval code, each code designating image information to be retrieved; and means for retrieving and outputting image information associated with said retrieval code input from said inputting means.

20. The apparatus according to claim 19, wherein said retrieving and outputting means includes means for comparing said desired retrieval code input by said inputting means with said retrieval codes stored in said retrieving memory means.

21. The apparatus according claim 12, further comprising:

means for determining whether the first pixel density of image information read out by said reading means coincides with the second pixel density of said outputting means;

means for controlling a page buffer memory to store image information for one page when a coincidence is obtained in said determining means; and means for supplying the image information for one page to said outputting means so as to form a view of an image having a full size of said outputting means.

22. The apparatus according to claim 21, further comprising:

means, when no coincidence is obtained by said determining means, for controlling said reading means to output the pixel density conversion factors of the image information and the outputing means so as to convert the pixel density of the image information to the pixel density of said outputting means.

* * * * *